United States Patent [19]

Goldberg

[11] Patent Number: 4,474,608

[45] Date of Patent: Oct. 2, 1984

[54] LOW SHRINKAGE MOISTURE RESISTANT SILICA CONTAINING TUNG OIL COMPOSITIONS

[75] Inventor: Newton N. Goldberg, Pittsburgh, Pa.

[73] Assignee: Westinghouse Electric Corp., Pittsburgh, Pa.

[21] Appl. No.: 471,118

[22] Filed: Mar. 1, 1983

[51] Int. Cl.³ .............................................. C08L 91/00
[52] U.S. Cl. .................................. 106/250; 106/251; 106/253; 106/263
[58] Field of Search ............... 106/251, 253, 244, 250, 106/263

[56] References Cited

U.S. PATENT DOCUMENTS 3,183,109  5/1965  Neumann et al. .................... 106/244

OTHER PUBLICATIONS

Chem. Abst. 61:1703h, 1964.
"The Chem. of Synthetic Resins" Ellis, vol. 1, Reinhold Pub., 1935, pp. 8, 1215–1219.

Primary Examiner—Theodore Morris
Attorney, Agent, or Firm—D. P. Cillo

[57] ABSTRACT

A low shrinkage silica containing hardenable composition is made, containing an anhydrous Lewis acid, a naturally occurring medium drying oil, and submicroscopic silicon dioxide.

10 Claims, No Drawings

LOW SHRINKAGE MOISTURE RESISTANT SILICA CONTAINING TUNG OIL COMPOSITIONS

BACKGROUND OF THE INVENTION

Certain Lewis acid catalysts, such as ferric chloride, dispersed in an oil such as rosin oil or linseed oil, have been used to promote the gelation of tung oil. The gelled tung oil can then be molded to form various articles, such as flooring tiles, as taught by C. Ellis in *The Chemistry of Synthetic Resins*, Chapter 61, p. 1218 (1935). Catalyzed tung oil compositions of this type, have also been used as fillers for metal articles, especially electromagnets. The compositions are, however, subject to inactivation in the presence of moisture, either from the atmosphere, or water tied up in the rosin or linseed dispersing oil. As a result, the manufacture of these compositions has been limited to low humidity days, so that the catalyst will be relatively water free and active when added to gel the tung oil. Such production methods are commercially inconvenient, and so there is a need for an additive which will counter the effect of water on the composition.

SUMMARY OF THE INVENTION

The above need has been met by the addition of small amounts of submicroscopic, particulate silicon dioxide, i.e., fumed silica, to Lewis acid catalytic solutions, prior to their use as a hardner for highly unsaturated, fast drying tung oil. In the preferred embodiment, an effective water scavenging amount of silicon dioxide, having a particle size of from about 0.005 micron to about 0.05 micron, is mixed with a naturally occurring, medium drying oil miscible in tung oil, such as castor oil, before addition of the Lewis acid catalyst and other hardener ingredients. When this silica containing Lewis acid hardener is added to gel tung oil, it provides a low shrinkage, moisture resistant, crack resistant potting compound, useful for molding various articles, filling metal voids, holding various articles in position, or protecting various electrical devices from moisture.

DESCRIPTION OF THE PREFERRED EMBODIMENT

This invention relates to the use of submicroscopic, particulate, silicon dioxide, as an additive to Lewis acid catalyst solutions that may have varying amounts of tramp water associated with them. This catalyst solution can be used to gel tung oil. The catalyzed tung oil system is divided into two components. The resin component contains the tung oil, which is a naturally occurring, highly unsaturated, highly reactive, fast drying fatty oil. The hardener component contains solid, anhydrous Lewis acid, such as ferric chloride ($FeCl_3$); preferably, a Lewis acid dispersing medium or carrier, such as at least one of liquid tricresyl phosphate, or liquid triphenyl phosphite, which is effective to disperse the Lewis acid catalyst; naturally occurring, medium drying, fatty oil, such as castor oil; and submicroscopic silicon dioxide. The anhydrous Lewis acid acts as a catalyst, i.e., works in an acidic fashion to encourage self-polymerization in a highly unsaturated fast drying oil such a tung oil. Although ferric chloride is preferred, any Lewis acid may be used, such as $AlCl_3$, $ZnCl_2$, $BF_3$, $SnCl_2$, and the like.

The anhydrous Lewis acid is optionally added to a liquid organic dispersant carrier, such as tricresyl phosphate or triphenyl phosphite. These materials can be mixed for about one hour at about 25° C. Use of tricresyl phosphate or triphenyl phosphite allows a more homogeneous admixture of the Lewis acid with castor oil. The mixture of anhydrous Lewis acid and tricresyl phosphate or triphosphite is then added to a mixture of submicroscopic silica and a naturally occurring, medium drying, fatty oil that is miscible with tung oil, such as linseed oil, cotton seed oil, soya oil, or preferably castor oil, and stirred until the admixture is homogeneous. As used herein, the term "medium drying, fatty oil" also includes semi-drying oils i.e. castor and cotton seed oil.

Castor oil, a naturally occurring, fatty oil serves as the preferred carrier for the mixture of anhydrous Lewis acid and tricresyl phosphate or triphenyl phosphite, due to its very high miscibility with tung oil. The preferred weight ratio of the hardener component of (anhydrous Lewis acid):(tricresyl phosphate or triphenyl phosphite):(naturally occurring, medium drying, fatty oil):(submicroscopic silicon dioxide) is about (1):(2.5 to 3):(10 to 20):(0.05 to 1). Use of over about 1 part silicon dioxide per 1 part Lewis acid will start to provide undesirable clarity effects and viscosity increases in the liquid hardener. Within the range of 0.05 to 1 part per 1 part Lewis acid, the silicon dioxide can effectively control and scavenge water present in the tung oil, castor oil or introduced by contact with moist air.

High atmospheric humidity or high water content primarily in the naturally occurring, medium drying, fatty oil, such as castor oil will inactivate the Lewis acid catalyst. Therefore, finely divided silicon dioxide is a necessary additive to the preferred, anhydrous ferric chloride-tricresyl phosphate-castor oil mixture. The amount of silicon dioxide used depends upon the humidity during ingredient admixing, and the amount of water contained in the castor oil. Submicroscopic silicon dioxide (commercially available from the Cabot Corp. as CAB-O-SIL and from the Degussa Corp. as AEROSIL), usually in the range of from about 0.005 micron to about 0.05 micron, may be used, however, a particle size of about 0.015 micron is preferred.

The fumed silicon dioxide comprises submicroscopic particles sintered together in branched, chain like formations having surface areas of from about 400 sq. m./g. to about 50 sq. m/g. The submicroscopic silicon dioxide has a hydrophilic effect, and forms weak hydrogen bonds with water in the admixture. The weak hydrogen bonding is easily broken by agitation and dispersion with an electric mixer. The submicroscopic silicon dioxide adsorbs the water in the hardener component system, which may amount to as high as 1 wt.% of the hardner component weight, and permits the ferric chloride to remain anhydrous and thus effective as a catalyst for the tung oil.

Combination of the tung oil component and the hardener component, in a weight ratio of about 4 to 6 parts tung oil:1 part hardener, results in the polymerization of the tung oil. Complete cure can be accomplished by heating at 90° C. to 100° C. for several hours.

EXAMPLE

A low-shrinkage tung oil composition was prepared from the following ingredients on a high humidity day:

| | |
|---|---|
| anhydrous FeCl₃ | 20 parts by wt. |
| tricresyl phosphate | 55 parts by wt. |
| castor oil | 323 parts by wt. |
| fumed silicon dioxide (0.015 micron) | 7 parts by wt. |
| tung oil | 2000 parts by wt. |

Anhydrous ferric chloride catalyst was added to tricresyl phosphate and mixed for one hour, until the admixture was homogeneous. The $FeCl_3$-tricresyl phosphate admixture was then added to castor oil and mixed until homogeneous. Fumed silica dioxide was then added to this mixture and stirred until it was evenly dispersed throughout the mixture. This mixture was then added to tung oil and gelation was complete after about 45 minutes, indicating that the Lewis acid catalyst remained very active. The weight ratio of the hardener component of (anhydrous $FeCl_2$ Lewis acid):(tricresyl phosphate):(castor oil):(fumed silica) was (20):(55):(325):(7) or (1):(2.75):(16):(0.35). The weight ratio of (tung oil):(hardener) was (2000):(407) or (4.9):(1). This composition would be very useful as a molding or filler composition.

I claim:

1. A low-shrinkage, hardenable composition comprising the admixture of:
   (A) a tung oil component, and
   (B) a hardener component, comprising the admixture of:
   (1) an anhydrous Lewis acid;
   (2) a naturally occurring, medium drying, fatty oil, and
   (3) an amount of submicroscopic silicon dioxide effective to act as a water scavenger in the composition, where, in the hardener component, the weight ratio of (anhydrous Lewis acid):(submicroscopic silicon dioxide) is from about (1):(0.05 to 1).

2. The composition of claim 1, wherein the anhydrous Lewis acid is selected from the group consisting of $FeCl_3$, $ZnCl_2$, $BF_3$, $AlCl_3$, $SnCl_2$ and mixtures thereof, and the hardener component also contains an organic carrier, effective to disperse the Lewis acid, selected from the group consisting of tricresyl phosphate, triphenyl phosphite and mixtures thereof.

3. The composition of claim 1, wherein the naturally occurring, medium drying, fatty oil is selected from the group consisting of castor oil, linseed oil, cotton seed oil, soya oil, and their mixtures.

4. The composition of claim 1, wherein the weight ratio of (tung oil component):(hardener component) is (4 to 6):1.

5. The composition of claim 1, wherein the silicon dioxide is fumed silicon dioxide, has a particle size of from about 0.005 micron to about 0.05 micron, and a surface area of from about 400 sq.m./g. to about 50 sq.m./g.

6. The composition of claim 2, wherein the organic Lewis acid carrier is tricresyl phosphate.

7. The composition of claim 2, where, in the hardener component, the weight ratio of (anhydrous Lewis acid):(organic Lewis acid carrier) (naturally occurring, medium drying, fatty oil):(submicroscopic silicon dioxide) is from about (1):(2.5 to 3):(10 to 20):(0.05 to 1).

8. The composition of claim 2, wherein the anhydrous Lewis acid is ferric chloride, the organic Lewis acid carrier is tricresyl phosphate, the naturally occurring, medium drying, fatty oil is castor oil, and the Lewis acid is added to a mixture of the castor oil and silicon dioxide.

9. A low-shrinkage, hardenable composition consisting essentially of the admixture of:
   (A) a tung oil component, and
   (B) a hardener component, consisting essentially of the admixture of:
   (1) an anhydrous Lewis acid;
   (2) an organic carrier effective to dispense the anhydrous Lewis acid;
   (3) a naturally occurring, fatty oil selected from the group consisting of castor oil, linseed oil, cotton seed oil, soya oil and mixtures thereof; and
   (4) an amount of submicroscopic silicon dioxide effective to act as a water scavenger in the composition, wherein the submicroscopic silicon dioxide has a particle size of from about 0.005 micron to about 0.05 micron, and where, in the hardener component, the weight ratio of (anhydrous Lewis acid):(organic Lewis acid carrier):(naturally occurring, medium drying, fatty oil):(submicroscopic silicon dioxide) is from about (1):(2.5 to 3):(10 to 20):(0.05 to 1).

10. The composition of claim 9, wherein the fatty oil is castor oil, the anhydrous Lewis acid is selected from the group consisting of $FeCl_3$, $ZnCl_2$, $BF_3$, $AlCl_3$, $SnCl_2$ and mixtures thereof, the organic carrier, effective to disperse the Lewis acid, is selected from the group consisting of tricresyl phosphate, triphenyl phosphite and mixtures thereof, the Lewis acid is added to a mixture of the castor oil and submicroscopic silicon dioxide, and the submicroscopic silicon dioxide is fumed silicon dioxide and has a surface area of from about 400 sq.m./g. to about 50 sq.m./g.

* * * * *